(12) United States Patent
Bae et al.

(10) Patent No.: US 9,799,092 B2
(45) Date of Patent: Oct. 24, 2017

(54) GRAPHIC PROCESSING UNIT AND METHOD OF PROCESSING GRAPHIC DATA BY USING THE SAME

(71) Applicant: SAMSUNG ELECTRONICS CO., LTD., Suwon-si (KR)

(72) Inventors: Jae-Wan Bae, Yongin-si (KR); Hyun-Jae Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 14/835,006

(22) Filed: Aug. 25, 2015

(65) Prior Publication Data

US 2016/0086303 A1 Mar. 24, 2016

(30) Foreign Application Priority Data

Sep. 18, 2014 (KR) .................. 10-2014-0124417

(51) Int. Cl.
*G06T 1/20* (2006.01)
*G09G 5/36* (2006.01)
*G06T 1/60* (2006.01)
*G09G 5/02* (2006.01)

(52) U.S. Cl.
CPC ............... *G06T 1/60* (2013.01); *G09G 5/026* (2013.01); *G09G 5/363* (2013.01); *G09G 2350/00* (2013.01); *G09G 2360/08* (2013.01); *G09G 2360/121* (2013.01)

(58) Field of Classification Search
CPC ........... G06T 15/005; G06T 1/20; G06T 1/60; G06T 15/80; G06T 17/20; G06T 2200/28; G06T 2210/52; G09G 2360/121; G09G 5/363; G09G 2360/10; G09G 5/001; G06F 9/52; G06F 9/544; G06F 12/0842; G06F 12/0864; G06F 2209/5017; G06F 8/4441; G06F 9/3802; G06F 9/3851; G06F 9/443; G06F 9/5027; G06F 9/5038; G06F 9/5061; G06F 9/5066
See application file for complete search history.

(56) References Cited

U.S. PATENT DOCUMENTS

5,584,014 A * 12/1996 Nayfeh ................. G06F 12/126
711/128
8,035,650 B2 10/2011 Du et al.
8,345,053 B2 1/2013 Jiao et al.
8,581,912 B2 11/2013 Oneppo et al.
(Continued)

*Primary Examiner* — Sultana M Zalalee
(74) *Attorney, Agent, or Firm* — Sughrue Mion, PLLC (57) ABSTRACT

A method and apparatus for processing graphic data, which are capable of decreasing a bandwidth of a memory, are provided. The method of processing graphic data includes receiving first graphic data and processing the first graphic data to generate second graphic data, and storing the generated second graphic data in a first shared memory line in which a state bit is set to a first state, wherein the first shared memory line is included in a first memory line set which is a part of an n-way set associative cache structure (n is a natural number equal to or greater than 2), at least one of the memory lines of the first memory line set is set to a second state which is different from the first state, and the state bit represents whether data stored in the memory line is replaceable.

15 Claims, 8 Drawing Sheets

(56) References Cited

U.S. PATENT DOCUMENTS

| | | |
|---|---|---|
| 2006/0294308 A1* | 12/2006 | Bailey ................ G06F 12/0802 711/118 |
| 2007/0153015 A1 | 7/2007 | You-Ming |
| 2009/0189909 A1* | 7/2009 | Jiao ............................ G06T 1/60 345/506 |
| 2009/0276607 A1* | 11/2009 | Bonola ............... G06F 9/30047 712/209 |
| 2011/0050716 A1 | 3/2011 | Mantor et al. |
| 2011/0115802 A1 | 5/2011 | Mantor et al. |
| 2013/0021360 A1 | 1/2013 | Gruber |
| 2013/0194286 A1 | 8/2013 | Bourd et al. |
| 2013/0293546 A1 | 11/2013 | Lee et al. |
| 2013/0326179 A1* | 12/2013 | Tsirkin ................. G06F 9/5016 711/163 |
| 2014/0092091 A1 | 4/2014 | Li et al. |
| 2014/0149651 A1* | 5/2014 | Forsyth ................ G06F 12/123 711/105 |

\* cited by examiner

| Index | Tag | 134 Data | Valid | Not replaceble |
|---|---|---|---|---|
| 0 | tag0 | Communication data | 0/1 | 0 |
| | tag1 | Communication data | 0/1 | 0 |
| | tag2 | Cache data | 0/1 | 0 |
| | tag3 | Cache data | 0/1 | 0 |
| 1 | tag4 | Communication data | 0/1 | 0 |
| | tag5 | Communication data | 0/1 | 0 |
| | tag6 | Cache data | 0/1 | 0 |
| | tag7 | Cache data | 0/1 | 0 |
| 2 | tag8 | Communication data | 0/1 | 0 |
| | tag9 | Communication data | 0/1 | 0 |
| | tag10 | Cache data | 0/1 | 0 |
| | tag11 | Cache data | 0/1 | 0 |
| 3 | tag12 | Cache data | 0/1 | 0 |
| | tag13 | Cache data | 0/1 | 0 |
| | tag14 | Cache data | 0/1 | 0 |
| | tag15 | Cache data | 0/1 | 0 |

| Index | Tag | 134 Data | Valid | Not replaceble |
|---|---|---|---|---|
| 0 | tag0 | Communication data | X | 1 |
| | tag1 | Communication data | X | 1 |
| | tag2 | Cache data | 0/1 | 0 |
| | tag3 | Cache data | 0/1 | 0 |
| 1 | tag4 | Communication data | X | 1 |
| | tag5 | Communication data | X | 1 |
| | tag6 | Cache data | 0/1 | 0 |
| | tag7 | Cache data | 0/1 | 0 |
| 2 | tag8 | Communication data | X | 1 |
| | tag9 | Communication data | X | 1 |
| | tag10 | Cache data | 0/1 | 0 |
| | tag11 | Cache data | 0/1 | 0 |
| 3 | tag12 | Cache data | 0/1 | 0 |
| | tag13 | Cache data | 0/1 | 0 |
| | tag14 | Cache data | 0/1 | 0 |
| | tag15 | Cache data | 0/1 | 0 |

| Index | Tag | 134<br>Data | Valid | Not<br>replaceble |
|---|---|---|---|---|
| 0 | tag0 | Cache data | 0/1 | 0 |
| | tag1 | Cache data | 0/1 | 0 |
| | tag2 | Cache data | 0/1 | 0 |
| | tag3 | Cache data | 0/1 | 0 |
| 1 | tag4 | Cache data | 0/1 | 0 |
| | tag5 | Cache data | 0/1 | 0 |
| | tag6 | Cache data | 0/1 | 0 |
| | tag7 | Cache data | 0/1 | 0 |
| 2 | tag8 | Cache data | 0/1 | 0 |
| | tag9 | Cache data | 0/1 | 0 |
| | tag10 | Cache data | 0/1 | 0 |
| | tag11 | Cache data | 0/1 | 0 |
| 3 | tag12 | Cache data | 0/1 | 0 |
| | tag13 | Cache data | 0/1 | 0 |
| | tag14 | Cache data | 0/1 | 0 |
| | tag15 | Cache data | 0/1 | 0 |

GRAPHIC PROCESSING UNIT AND METHOD OF PROCESSING GRAPHIC DATA BY USING THE SAME

CROSS-REFERENCE TO RELATED APPLICATION

This application claims priority, under 35 U.S.C. §119, from Korean Patent Application No. 10-2014-0124417 filed on Sep. 18, 2014 in the Korean Intellectual Property Office, the contents of which are hereby incorporated herein by reference in their entirety.

TECHNICAL FIELD

The present inventive concept relates to a graphic processing unit, and a method of processing graphic data by using the same.

BACKGROUND

The graphic processing unit (GPU) is a processing core which exclusively carries out graphical computations in a computing system. A graphical pipeline is a hardware configuration of the GPU, which outputs a two-dimensional rendering image by using a three-dimensional object as an input. Recently, an increase in display resolution has caused a sharp increase in an amount of computations performed by the GPU and an amount of bandwidth of memory that is used.

SUMMARY

Exemplary embodiments may provide a method of processing graphic data, which is capable of decreasing the usage of bandwidth of a memory while processing graphic data.

Exemplary embodiments may also provide a graphic processing unit, which is capable of decreasing the usage of bandwidth of a memory while processing graphic data.

Technical problems addressed by the exemplary embodiments are not limited to the above-mentioned technical problems, and the exemplary embodiments may address other technical problems, which are not mentioned above, as can be clearly understood by those skilled in the art from the following description.

According to an aspect of an exemplary embodiment, there is provided a method of processing graphic data. The method includes receiving first graphic data and processing the first graphic data to generate second graphic data; and storing the generated second graphic data in a first shared memory line in which a state bit is set to a first state, wherein the first shared memory line is included in a first memory line set which is a part of an n-way set associative cache structure (n is a natural number equal to or greater than 2), at least one of the memory lines of the first memory line set is set to a second state which is different from the first state, and the state bit represents whether data stored in the memory line is replaceable.

The method may further include setting the state bit of the first shared memory line to the first state before receiving the first graphic data.

The setting of the state bit of the first shared cache line to the first state may include allocating a memory for a local space, and associating an index and a tag of the first shared memory line to one of the memory addresses of the allocated memory.

The method may further include receiving the second graphic data stored in the first shared memory line and processing the received second graphic data to generate third graphic data, and setting the state bit of the first shared memory line to the second state after generating the third graphic data.

The setting of the state bit of the first shared memory line to the second state may include deallocating a memory allocated for a local space, and removing the first state, which is set in the state bit of the first shared memory line, after the deallocation.

When the first shared memory line is set to the first state, the second graphic data may not be transmitted to the memory.

The first state may represent that data stored in a memory line is not replaceable by a cache policy, and the second state represents that data stored in a memory line is replaceable by the cache policy.

The second graphic data may not be stored in a memory line which is set to the second state.

The method may further include receiving the second graphic data stored in the first shared memory line and processing the received second graphic data to generate third graphic data, and storing the generated third graphic data to a second shared memory line in which a state bit is set to the first state.

According to an aspect of another exemplary embodiment, there is provided a graphic processor unit. The graphics processing unit includes: a first shader core configured to receive input graphic data and process the input graphic data to generate first graphic data; a second shader core configured to receive the first graphic data and process the first graphic data to generate second graphic data; and a cache configured to receive the first graphic data from the first shader core, and provide the first graphic data to the second shader core, wherein the cache includes: a data storage region including a shared memory line, in which the first graphic data is stored, and data stored in the shared memory line according to a cache policy is not replaced, and a cache line, in which cache data is stored, and data stored in the cache line according to the cache policy is replaceable; a communication manager configured to manage a local address of the shared memory line, and not to manage a local address of the cache line; and a cache controller module configured to manage the local address of the cache line.

The cache may further include a not replaceable bit (NRB) module. the NRB module manages whether the data stored in the data storage region is replaceable according to the cache policy.

The NRB module may set a state bit of the shared memory line to a first state, and sets a state bit of the cache line to a second state.

The NRB module may determine a state bit of the data storage region corresponding to a virtual address of the data requested by the second shader core.

The cache may include an n-way set associative cache structure (n is a natural number equal to or greater than 2), the data storage region may include a plurality of cache line sets, and one or more cache line sets among the plurality of cache line sets includes the shared memory line and the cache line.

According to an aspect of another exemplary embodiment, the cache may include a multiplexer (MUX) that when a virtual address of data requested by the second shader core corresponds to a local address of the shared memory line, the MUX receives the local address of the shared memory line from the communication manager and provides the received local address to the data storage region, and when a virtual address of data requested by the second shader core corresponds to a local address of the cache memory line, the MUX receives the local address of the cache line from the cache controller module and provides the received local address to the data storage region.

BRIEF DESCRIPTION OF THE DRAWINGS

The above and other features and advantages of the present inventive concept will become more apparent by describing in detail exemplary embodiments thereof with reference to the attached drawings in which.

DETAILED DESCRIPTION OF THE EXEMPLARY EMBODIMENTS

Advantages and features of the exemplary embodiments and methods of accomplishing the same may be understood more readily by reference to the following detailed description of exemplary embodiments and the accompanying drawings. The present inventive concept may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present inventive concept will only be defined by the appended claims. Like reference numerals refer to like elements throughout the specification.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The term "unit" or "module," as used herein, means, but is not limited to, a software or hardware component, such as a field programmable gate array (FPGA) or an application specific integrated circuit (ASIC), which performs certain tasks. A unit or module may advantageously be configured to reside in the addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Figure 1:
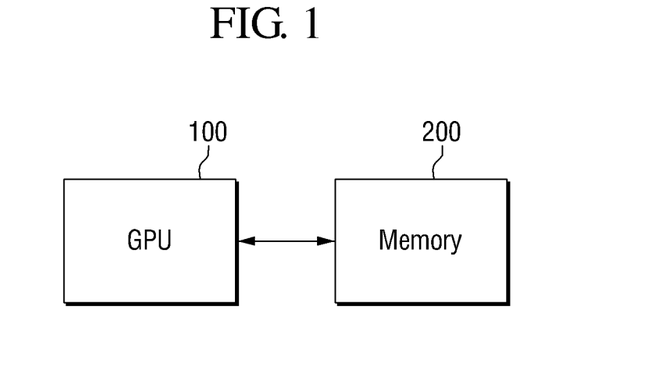
FIG. 1 is a block diagram illustrating a graphic processing system including a graphic processing unit according to an exemplary embodiment.

FIG. 1 is a block diagram for describing a graphic processing system including a graphic processing unit according to an exemplary embodiment of the present inventive concept.

Referring to FIG. 1, the graphic processing system according to an exemplary embodiment includes a graphic processing unit (GPU) 100 and an external memory 200.

The GPU 100 may be configured to provide a rendering function, e.g., render image data to be displayed. Particularly, the GPU 10 according to an exemplary embodiment of the present inventive concept may be configured to provide tile-based rendering. To this end, the GPU 100 may include graphics pipeline configurations. The graphics pipeline may also be called a rendering pipeline. The graphics pipeline configurations may process input graphic data in parallel. Further, the graphics pipeline configurations may be configured by software or hardware.

The external memory 200 is configured to store data. The external memory 200 may store graphic data processed by the GPU 100, or store graphic data provided to the GPU 100.

Otherwise, the external memory 200 may serve as an operation memory of the GPU 100.

In the graphic processing system according to the exemplary embodiment of the present inventive concept, the graphic data stored in the external memory 200 may be initially input graphic data before performing the rendering or outputting the final resulting graphic data after performing the rendering. Intermediate stage graphic data, which is generated during the rendering, may not be stored in the external memory 200. This will be described with reference to FIGS. 4 to 11.

The external memory 200 may include one or more volatile memory devices, such as a double data rate static random-access memory (DDR SDRAM) and a single data rate SDRAM, and/or one or more non-volatile memory devices, such as an electrical erasable programmable read-only memory (EEPROM) and a flash memory, but is not limited thereto.

Figure 2:
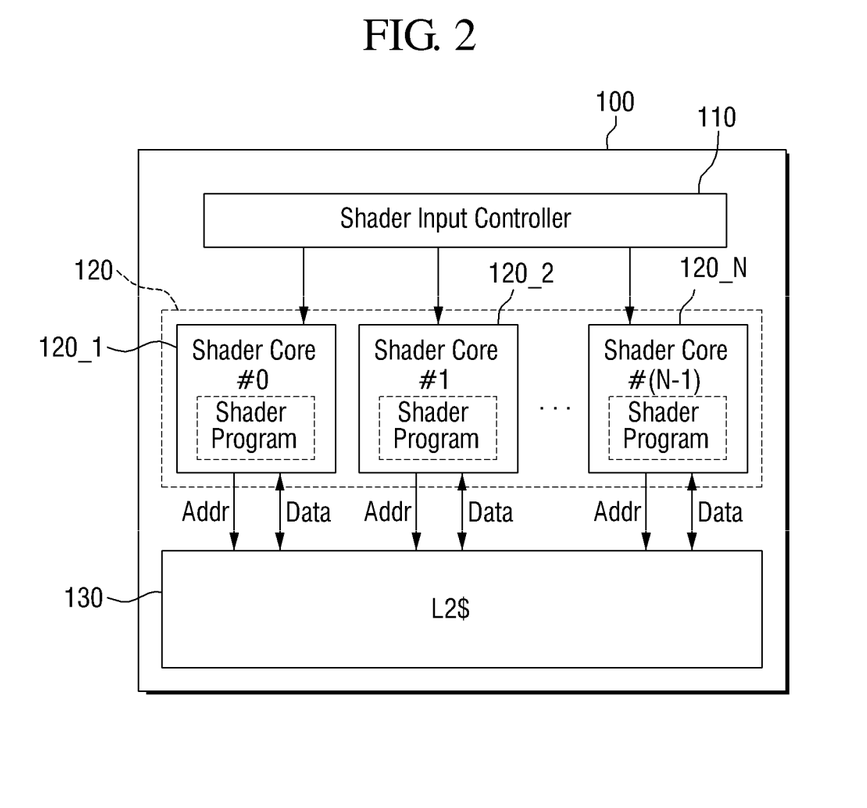
FIG. 2 is a block diagram illustrating a configuration of the graphic processing unit of FIG. 1.
Figure 3:
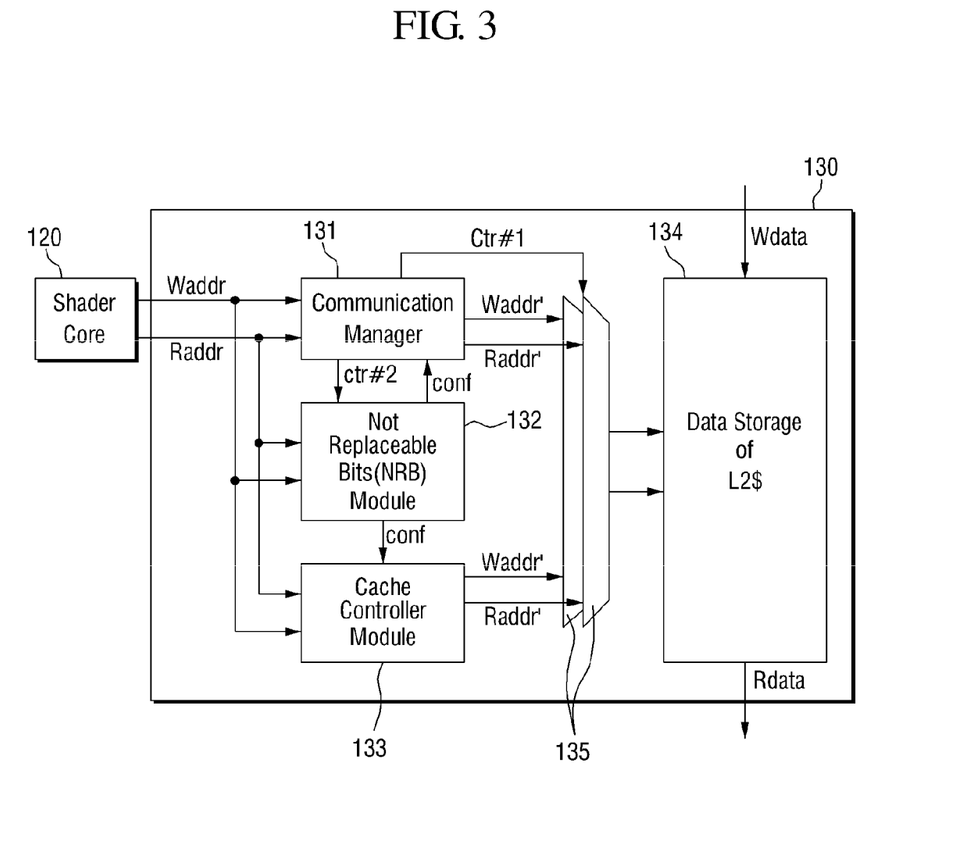
FIG. 3 is a block diagram illustrating a detailed configuration of a cache of FIG. 2.

FIG. 2 is a block diagram illustrating a configuration of the graphic processing unit of FIG. 1. FIG. 3 is a block diagram for describing a detailed configuration of a cache of FIG. 2.

Referring to FIG. 2, the GPU 100 may include a shader input controller 110, a shader core 120, a cache 130, and the like.

The shader input controller 110 may receive graphic commands from a host, such as a central processing unit (CPU). The shader input controller 110 may store the received graphic commands, and generate an operation appropriate to the graphic command.

The shader input controller 110 may allocate the generated operation to one of shader cores 120_1, 120_2, and 120_N among a shader core group 120. The allocation may include the transmission of data for the operation to the shader core.

The shader core group 120 may include the plurality of shader cores 120_1, 120_2, and 120_N. Each of the shader cores 120_1, 120_2, and 120_N may be, for example, a vertex shader, a geometry shader, and a pixel shader, but is not limited thereto. That is, two or more combined shader cores may be, for example, a vertex shader, a geometry shader, or a pixel shader as a matter of course. Further, the shader core group 120 may include the plurality of shader cores performing the same function.

Each of the shader cores 120_1, 120_2, and 120_N may include a shader program capable of performing a graphic operation transmitted from the shader input controller 110.

Each of shader cores 120_1, 120_2, and 120_N may receive input graphic data, process the received input graphic data, and generate output graphic data.

Here, the input graphic data received by each of the shader cores 120_1, 120_2, and 120_N may be initial graphic data which is not processed by the GPU 100, or intermediate graphic data generated through at least one shader core. Further, the output graphic data generated by each of the shader cores 120_1, 120_2, and 120_N may be intermediate graphic data requiring additional processing by another shader core, or final graphic data of which processing is completed by the GPU 100.

The vertex shader may be used for, for example, giving a particular effect to an object by performing a mathematical operation on vertex information about the object. The information on the vertex may be, for example, information on x, y, and z-coordinates indicating three-dimensional positions, a color, texture, and lighting. The vertex shader may move the object to a specific position, change texture, or change a color by changing a value of the vertex information.

The geometry shader may generate a figure, such as a dot, a line, and a triangle. A shader program included in the geometry shader may be performed after the performance of the vertex shader. The shader program included in the geometry shader may receive information on the figure passing through the vertex shader. For example, when three vertexes are input into the geometry shader, the shader program included in the geometry shader may remove all of the vertexes, and create and transmit more figures.

The pixel shader may calculate a color of each pixel to be rendered. Accordingly, the pixel shader determines how the pixel is finally viewed. The pixel shader may also always output the same color, or perform various operations, such as reading a color from texture, applying light, bump mapping, shadow, reflective light, and processing to be transparent. Since the pixel shader is performed when each pixel is rendered, the pixel shader may not be related to other pixels. The pixel shader may output a depth or another color, other than the color of the pixel.

Each of the shader cores 120_1, 120_2, and 120_N may transceive data "Data" with cache 130, and provide a virtual address "Addr" for the data to the cache 130. The data "Data" transceived by each of the shader cores 120_1, 120_2, and 120_N with the cache 130 may be cache data necessary for an operation of the shader program or graphic data processed or to-be-processed by the shader cores 120_1, 120_2, and 120_N. The virtual address "Addr" provided by the shader cores 120_1, 120_2, and 120_N to the cache 130 may be a virtual address in which cache data is positioned or a virtual address in which graphic data is positioned.

An operation between each of the shader cores 120_1, 120_2, and 120_N and the cache 130 for the virtual address "Addr" and the data "Data" will be described below.

Referring to FIG. 3, the cache 130 may include a communication manager 131, a not replaceable bits (NRB) module 132, a cache controller module 133, a data storage region 134, and the like.

In the GPU 100 according to the exemplary embodiment of the present inventive concept, the cache 130 may have a structure of an n-way set associative cache (n is a natural number equal to or greater than 2). This will be described in detail with reference to FIGS. 6 and 7.

The data storage region 134 includes a shared memory line, in which the intermediate graphic data generated by the shader core 120 is stored, and a cache line in which the cache data necessary for the operation of the shader core 120 is storable.

The shared memory line is a storage region in which data stored in the shared memory line is not replaced by a cache policy, and the cache line is a storage region in which data stored in the cache line is replaceable by the cache policy. The shared memory line and the cache line may be clearly described with reference to the operation of the GPU 100, so that a description thereof will be described with reference to FIGS. 4 to 11.

The communication manager 131 may manage a local address of the shared memory line. The communication manager 131 may not manage a local address of the cache line. That is, the communication manager 131 may manage only the local address for the shared memory line in which the stored data is not replaced by the cache policy.

The cache controller module 133 may manage the local address of the cache line. For example, the cache controller module 133 may manage an index bit and a tag bit for the cache line.

Contrast to the communication manager 131, the cache controller module 133 may manage the local address of the shared memory line, for example, the index bit and the tag bit for the shared memory line.

The NRB module 132 may manage whether the data stored in the data storage region 134 is replaceable by the cache policy. That is, the NRB module 132 may manage a value of the NRB for the shared memory line and the cache line.

The NRB module 132 may set or reset a value of a state bit indicating the NRB, that is, whether the data is replaceable by the cache policy. The NRB module 132 may set the NRB for the shared memory line to a first state, and set the NRB for the cache line to a second state different from the first state. Here, the NRB set to the first state indicates that the data stored in the shared memory line is not replaceable, and the NRB set to the second state indicates that the data stored in the cache line is replaceable.

The NRB module 132 may reset the set NRB to the first state or the second state. That is, the NRB module 132 may remove the NRB which is set to the first state, or reset the NRB, which is set to the first state, to the second state.

The setting or resetting of the value of the NRB by the NRB module 132 may be controlled by the communication manager 131.

In order to read the data stored in the data storage region 134 of the cache 130, each of the shader cores 120_1, 120_2, and 120_N included in the shader core group 120 provides a virtual address "Raddr" for the data to the communication manager 131, the NRB module 132, and the cache controller module 133.

Otherwise, in order to write the data in the data storage region 134 of the cache 130, each of the shader cores 120_1, 120_2, and 120_N provides a virtual address "Waddr" for the data to the communication manager 131, the NRB module 132, and the cache controller module 133.

When the virtual addresses "Raddr" and "Waddr" requested by each of the shader cores 120_1, 120_2, and 120_N correspond to the local address of the shared memory line, the communication manager 131 provides local addresses "Raddr'" and "Waddr'" of the shared memory line, in which the requested data is stored, to a multiplexer (MUX) 135 included in the cache 130.

When the virtual addresses "Raddr" and "Waddr" requested by each of the shader cores 120_1, 120_2, and 120_N correspond to the local address of the cache line, the cache controller module 133 provides local addresses "Raddr'" and "Waddr'" of the cache line, in which the requested data is stored, to the MUX 135.

Since the cache controller module 133 also manages the local address of the shared memory line, even when the virtual addresses "Raddr" and "Waddr" requested by each of the shader cores 120_1, 120_2, and 120_N correspond to the local address of the shared memory line, the cache controller module 133 provides the local addresses "Raddr'" and "Waddr'" of the shared memory line to the MUX 135.

The MUX 135 provides the local addresses "Raddr'" and "Waddr'" of the shared memory line provided by the communication manager 131 and the local addresses "Raddr'" and "Waddr'" of the cache line provided by the cache controller module 133 to the data storage region 134.

When the virtual addresses "Raddr" and "Waddr" requested by each of the shader cores 120_1, 120_2, and 120_N correspond to the local address of the shared memory line, the MUX 135 receives the local addresses "Raddr'" and "Waddr'" of the shared memory line from the communication manager 131 and the cache controller module 133, respectively. However, in this case, the MUX 135 provides the local addresses "Raddr'" and "Waddr'" of the shared memory line provided by the communication manager 131 to the data storage region 134.

In the graphic processing unit according to the exemplary embodiment of the present inventive concept, the MUX 135 may be controlled by the communication manager 131. That is, the communication manager 131 may control the MUX 135 through a first control signal Ctr#1. The MUX 135 may provide one of the local addresses "Raddr'" and "Waddr'" of the shared memory line provided by the communication manager 131 and the local addresses "Raddr'" and "Waddr'" of the cache line provided by the cache controller module 133 to the data storage region 134.

The data storage region 134 receiving the local addresses "Raddr'" and "Waddr'" of the shared memory line provided by the communication manager 131 and the local addresses "Raddr'" and "Waddr'" of the cache line provided by the cache controller module 133 may provide the data "Rdata" stored in the local addresses "Raddr'" and "Waddr'" to each of the shader cores 120_1, 120_2, and 120_N, or store the data "Wdata" in the local addresses "Raddr'" and "Waddr'."

The NRB module 132 determines a value of the NRB, that is, the state bit of the data storage region 134 corresponding to the virtual addresses "Raddr" and "Waddr" requested by each of the shader cores 120_1, 120_2, and 120_N. That is, the NRB module 132 determines whether the data storage region 134 corresponding to the requested virtual addresses "Raddr" and "Waddr" is the shared memory line or the cache line.

Through this, the NRB module 132 may provide a result of the determination on whether the data storage region 134 corresponding to the requested virtual addresses "Raddr" and "Waddr" is the shared memory line or the cache line to the communication manager 1313 and the cache controller module 133 through a confirmation signal "conf."

The NRB module 132 may receive a second control signal "Ctr#2" from the communication manager 131 to set or reset the value of the NRB of the memory line (the shared memory line and the cache line) included in the data storage region.

A method of processing graphic data according to an exemplary embodiment of the present inventive concept will be described with reference to FIGS. 2 to 11.

Figure 4:
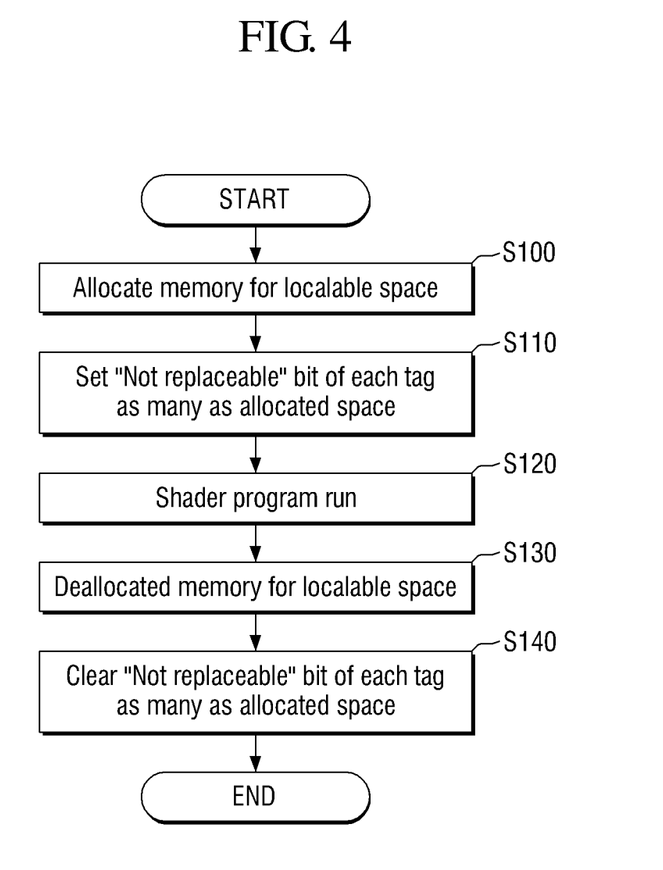
FIG. 4 is a flowchart describing a graphic data processing method according to an exemplary embodiment.
Figure 5:
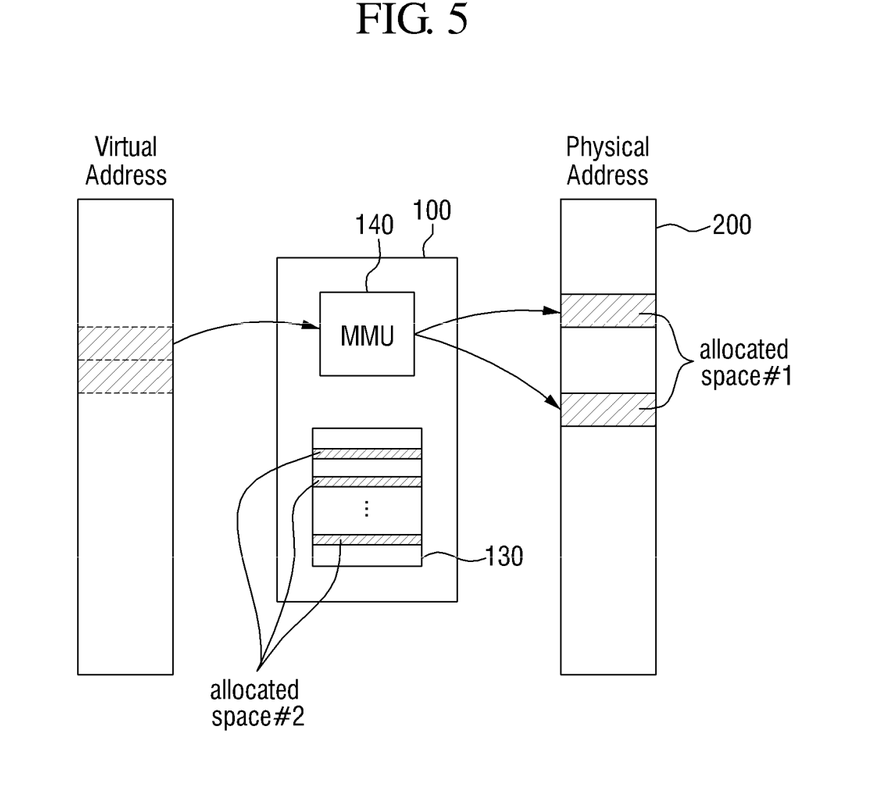
FIGS. 5 to 7 are diagrams for describing operation S100 of FIG. 4.
Figure 6:
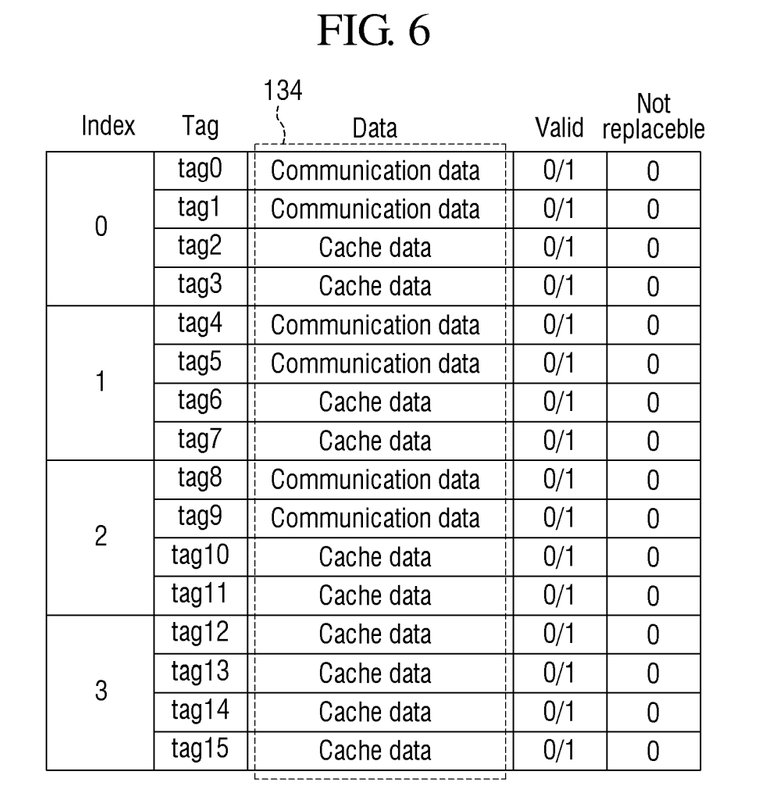
Figure 7:
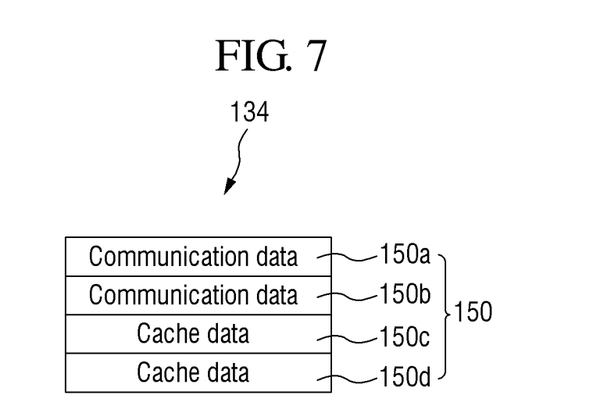
Figure 8:
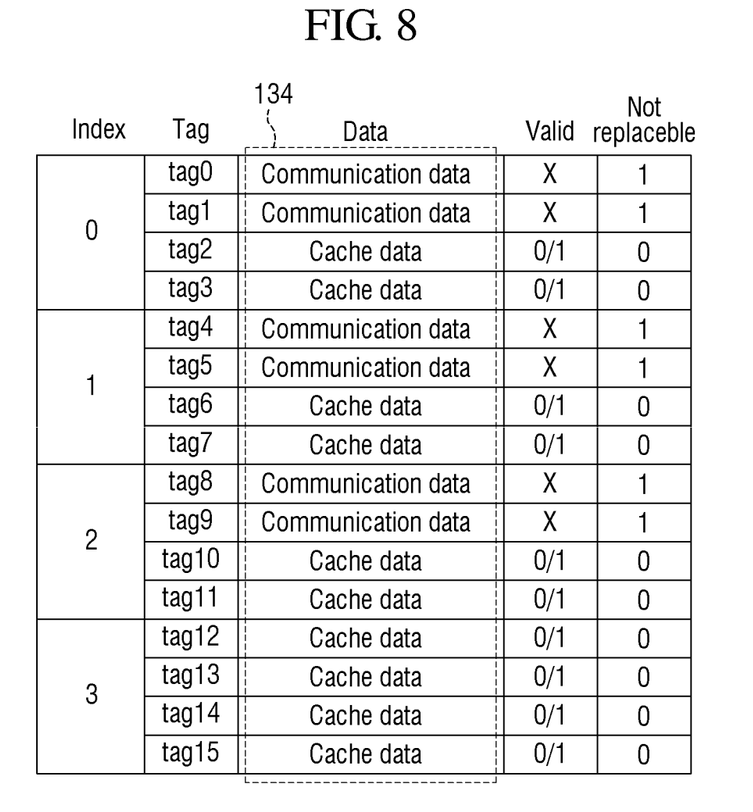
FIG. 8 is a diagram for describing operation S110 of FIG. 4.
Figure 9:
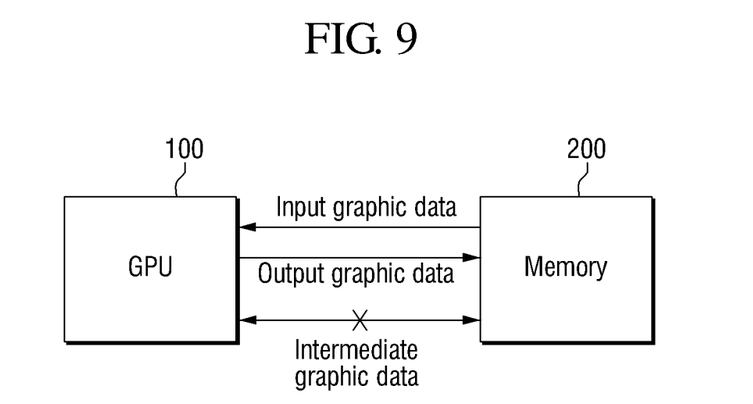
FIGS. 9 and 10 are diagrams for describing operation S120 of FIG. 4.
Figure 10:
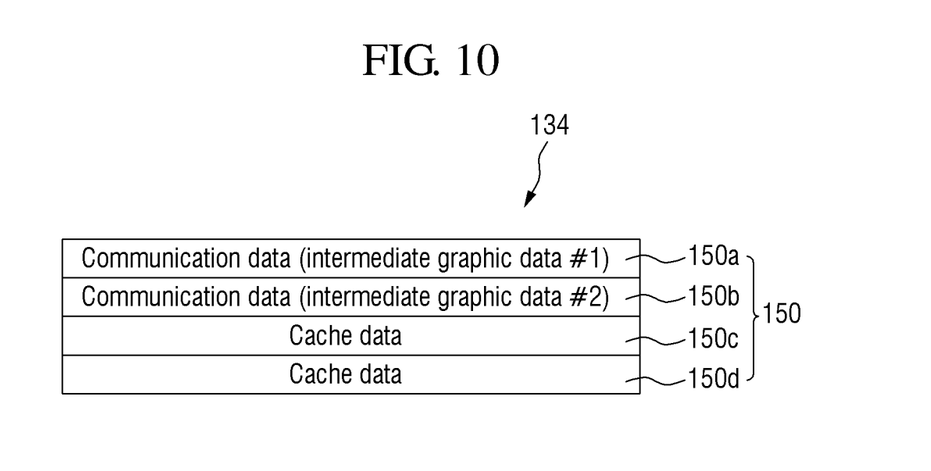
Figure 11:
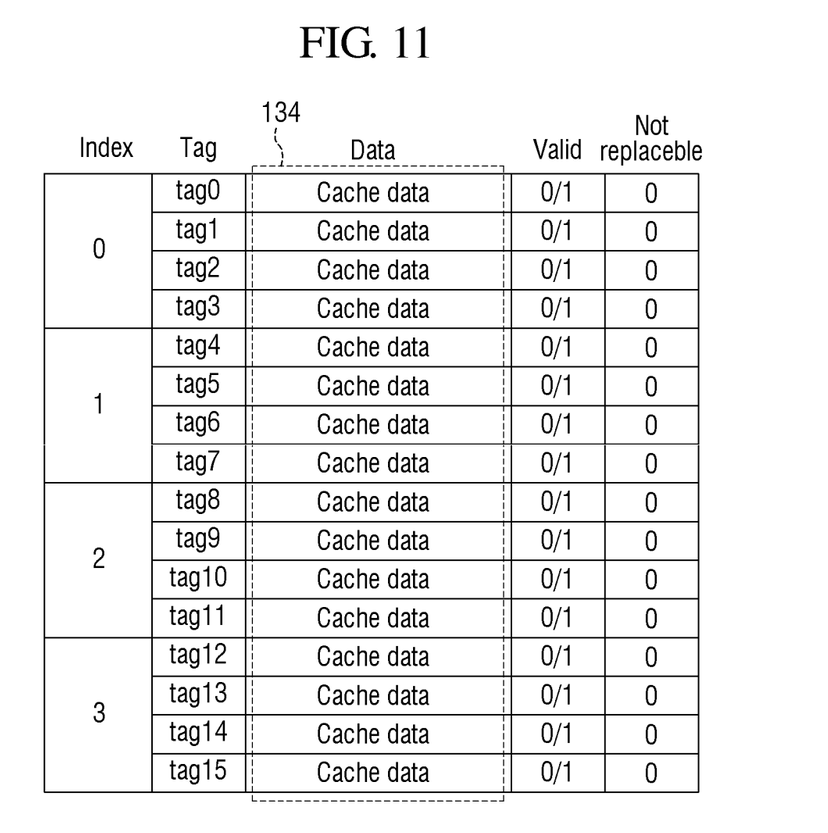
FIG. 11 is a diagram for describing operation S140 of FIG. 4.

FIG. 4 is a flowchart for describing a graphic data processing method according to an exemplary embodiment of the present inventive concept. FIGS. 5 to 7 are diagrams for describing operation S100 of FIG. 4. FIG. 8 is a diagram for describing operation S110 of FIG. 4. FIGS. 9 and 10 are diagrams for describing operation S120 of FIG. 4. FIG. 11 is a diagram for describing operation S140 of FIG. 4.

Referring to FIGS. 4 to 7, a memory is allocated for local spaces (operation S100). For example, the allocation of the memory for the local spaces may use a "local" option.

That is, when it is desired to allocate the memory corresponding to 8 Kbyte as a local space, for example, "malloc (8K, local)" may be used.

More particularly, a virtual address for the local spaces within the external memory 200 is allocated by software (for example, DDK or kernel).

Next, the memory manager unit 140 included in the GPU 100 may convert the allocated virtual address to a physical address.

First local spaces (allocated space #1) are allocated to the external memory 200 by the converted physical address.

Second local spaces (allocated space #2) corresponding to the first local space (allocated space #1) allocated to the external memory 200 are allocated within the cache 130. More particularly, the second local spaces (allocated space #2) are allocated in the data storage region 134 included in the cache 130.

An index bit and a tag bit indicating the second local space (allocated space #2) may correspond to the physical addresses of the first local spaces (allocated space #1), respectively.

Each of the second local spaces (allocated space #2) illustrated in FIG. 5 may be spaces for storing communication data of FIG. 6. That is, the spaces within the data storage region 134 corresponding to the first local spaces (allocated space #1) allocated in the external memory 200 are memory lines corresponding to the case where the index is 0, and the tag is 0 and 1, the case where the index is 1, and the tag is 4 and 5, and the case where the index is 2, and the tag is 8 and 9.

The communication data may be stored in the memory lines within the data storage region 134 corresponding to the first local spaces (allocated space #1) allocated in the external memory 200. Further, the cache data may be stored in the memory line within the data storage region 134 which is allocated so that the communication data is not stored.

The communication data may be the intermediate graphic data generated by the shader core 120 (See FIG. 2). That is, the communication data may be, for example, the intermediate graphic data.

The cache data may be data used for the operation of the shader core 120 (see FIG. 2). That is, the cache data may not be the intermediate graphic data.

That is, the memory lines within the data storage region 134 corresponding to the first local spaces (allocated space #1) allocated in the external memory 200 may be spaces for storing the intermediate graphic data.

The intermediate graphic data is shared by several shader cores while the GPU 100 is operated, so that the memory line, in which the intermediate graphic data, that is, the communication data, is storable, may be the shared memory line. By contrast, the memory line in which the communication data is not stored and the cache data is stored may be the cache line.

A cache structure for the local space will be described with reference to FIGS. 6 and 7.

When only one memory line corresponds to one index space, and the corresponding memory line is allocated as the shared memory line, the index space allocated as the shared memory line cannot be used as a caching space any longer. That is, when the cache data of the index space allocated as the shared memory line is requested by the shader core and the like, the requested data may be directly provided to the shader core and the like from the external memory. Such a phenomenon may disturb a speed of data processing.

Accordingly, a plurality of memory lines needs to correspond to one index space. Further, only some of the plurality of memory lines corresponding to one index space needs to be allocated to the shared memory line. Accordingly, the cache 130 needs to have the n-way set associative cache (n is a natural number equal to or greater than 2).

FIG. 6 illustrates an example of the four-way set associative cache. Further, FIG. 6 illustrates the case where the number of memory line sets, each of which includes four ways, that is, four memory lines, is four (an index depth is 4), but the present disclosure is not limited thereto.

Referring to the case where the index bit is 0 of FIG. 6, four memory lines may correspond to one index space. Further, only two of four memory lines 150a, 150b, 150c, and 150d are allocated as the shared memory line for the communication data, and the remaining two memory lines may be allocated as the cache lines for the cache data. For example, when it is assumed that a memory line set, in which the index bit is 0, is a first memory line set 150, the first memory line set 150 includes a first shared memory line 150a, a second shared memory line 150b, and two cache lines 150c and 150d.

Referring to the case where the index bit is 1 of FIG. 6, a memory line set, in which the index bit is 1, includes two shared memory lines and two cache lines. However, referring to the case where the index bit is 4, a memory line set, in which the index bit is 4, may include only four cache lines without the shared memory line.

Referring to FIGS. 4 and 8, a value of the NRB of each of the tags having the same number of second local spaces (allocated space #2) allocated to the data storage region 134 is set to the first state ("1") (operation S110).

That is, the value of the NRB of the memory line, in which the communication data is to be stored, is set to the first state. In addition, a value of the NRB of the memory line, in which the cache data is to be stored, is set to the second state ("0"). For example, the value of the NRB of the memory line, in which the cache data is to be stored, is maintained in "0", so that the value of the NRB of the memory line, in which the cache data is to be stored, is set to the second state ("0").

The case where the value of the NRB is in the first state represents that the data stored in the memory line, that is, the shared memory line, is not replaceable with other data by the cache policy. By contrast, the case where the value of the NRB is in the second state represents that the data stored in the memory line, that is, the cache line, is replaceable with other data by the cache policy. In other words, the NRB value of 1 indicates that the data stored in the memory line is not replaceable. Further, the NRB value of 0 indicates that the data stored in the memory line is replaceable. However, the NRB value for the first state and the second state may be inverted in another exemplary embodiment.

The setting of the value of the NRB will be described with reference to FIG. 3.

The communication manager 131 receives a local address for the second local space (allocated space #2) allocated in the data storage region 134. The communication manager 131 provides the second control signal "Ctr #2" to the NRB module 132 so as to set the value of the NRB corresponding to the received local address to the first state ("1").

The NRB module 132 receiving the second control signal "Ctr #2" sets the value of the NRB corresponding to the second local space (allocated space #2) to the first state ("1"). That is, the value of the NRB of the shared memory lines in which the communication data is to be stored, is set to the first state, and the value of the NRB of the cache line, in which the cache data is to be stored, is set to the second state.

The NRB module 132 may manage a value of the NRB for the shared memory line and the cache line.

Referring to FIGS. 7 and 8, the value of the NRB of each of a first shared memory line 150a and a second shared memory line 150b, which are the regions, in which the communication data is to be stored, is set to the first state ("1"), and the value of the NRB of each of the cache lines 150c and 150d, in which the cache data is to be stored, is set to the second state ("0").

In FIG. 8, in the value of the NRB, a valid bit of the shared memory line set to the first state ("1") is indicated by "X". "X" means that it is not necessary to consider validity of the communication data which is to be stored in the shared memory line.

Referring to FIGS. 2 to 4, 9, and 10, a shader program included in each of the shader cores 120_1, 120_2, and 120_N is executed (operation S120).

Particularly, the first shader core 120_1 receives initial input graphic data.

For example, the first shader core 120_1 provides a virtual address "Raddr" of the region in which the initial input graphic data is stored to the cache 130. The initial input graphic data is provided to the GPU 100 from the external memory 200 according to a request of the first shader core 120_1. The initial input graphic data is provided to the first shader core 120_1 through the cache line for storing the cache data in the data storage region 134.

The initial input graphic data is processed by using the shader program included in the first shader core 120_1. Accordingly, the first shader core 120_1 generates first intermediate graphic data (intermediate graphic data #1).

The first shader core 120_1 may generate a plurality of intermediate graphic data by processing the initial input graphic data. However, one intermediate graphic data generated by the first shader core 120_1 is described for convenience of the description.

In order to write the first intermediate graphic data in the data storage region 134, the first shader core 120_1 provides a virtual address "Waddr" for the first intermediate graphic data to the communication manager 131, the NRB module 132, and the cache controller module 133.

The NRB module 132 determines whether the value of the NRB of the data storage region 134 corresponding to the virtual address "Waddr" provided by the first shader core 120_1 is in the first state or the second state.

Since the virtual address "Waddr" provided by the first shader core 120_1 corresponds to the local address of the first shared memory line 150a in which the communication data is to be stored, the communication manager 131 provides a local address "Waddr'" of the first shared memory line 150a to the MUX 135.

The MUX 135 provides the local address "Waddr'" of the first shared memory line 150a to the data storage region 134. Through this, the first intermediate graphic data (intermediate graphic data #1) is written and stored in the first shared memory line 150a.

Accordingly, the first intermediate graphic data (intermediate graphic data #1) generated by the first shader core 120_1 is written in the first shared memory line 150a in which the value of the NRB is set to the first state ("1").

Since the first intermediate graphic data (intermediate graphic data #1) corresponds to the communication data, the value of the NRB is not stored in the cache lines 150c and 150d in which the value of the NRB is set to the second state ("0").

The first state ("1") represents that the data stored in the memory line is not replaceable with other data by the cache policy, so that the first intermediate graphic data (intermediate graphic data #1) is not transmitted to the external memory 200 while the value of the NRB of the first shared memory line 150a is in the first state ("1").

In FIG. 10, it is described that one first intermediate graphic data (intermediate graphic data #1) is generated, but this is for convenience of the description, and the exemplary embodiments are not limited thereto. That is, the first shader core 120_1 may generate N first intermediate graphic data (intermediate graphic data #1) (N>1) and store the first intermediate graphic data (intermediate graphic data #1) in each of N shared memory lines as a matter of course.

Next, the second shader core 120_2 receives the first intermediate graphic data (intermediate graphic data #1) stored in the first shared memory line 150a.

Particularly, in order to read the first intermediate graphic data (intermediate graphic data #1), the second shader core 120_2 provides a virtual address "Raddr" for the first shared memory line 150a to the communication manager 131, the NRB module 132, and the cache controller module 133.

The communication manager 131 determines whether the virtual address Raddr requested by the second shader core 120_2 corresponds to the local address of the first shared memory line 150a, that is, an index bit and a tag bit of the first shared memory line 150a.

Since the virtual address "Raddr" requested by the second shader core 120_2 corresponds to the local address of the first shared memory line 150a, the communication manager 131 provides a local address "Raddr'" of the first shared memory line 150a to the MUX 135. Through this, the first intermediate graphic data (intermediate graphic data #1) is provided to the second shader core 120_2.

Next, the first intermediate graphic data is processed by using a shader program included in the second shader core 120_2. Accordingly, the second shader core 120_2 generates second intermediate graphic data (intermediate graphic data #2).

In the above description, it is described that the second shader core 120_2 receives the first intermediate graphic data (intermediate graphic data #1) and generates the second intermediate graphic data (intermediate graphic data #2), but the exemplary embodiments are not limited thereto.

That is, the first shader core 120_1 may receive the first intermediate graphic data (intermediate graphic data #1) stored in the shared memory line again, and generate the second intermediate graphic data (intermediate graphic data #2) as a matter of course.

In addition, when the first shader core 120_1 generates N first intermediate graphic data (intermediate graphic data #1) (N>1), the first shader core 120_1 receives M first intermediate graphic data (intermediate graphic data #1) again (M>1) among the first intermediate graphic data (intermediate graphic data #1) stored in the N shared memory lines, and generate the second intermediate graphic data (intermediate graphic data #2).

The second intermediate graphic data (intermediate graphic data #2) may be stored in the shared memory line in which the value of the NRB is set to the first state ("1") through a similar process to that in which the first intermediate graphic data (intermediate graphic data #1) is written in the first shared memory line 150a. For example, the second intermediate graphic data (intermediate graphic data #2) may be stored in the second shared memory line 150b, which is, but, for convenience of the description, and the exemplary embodiments are not limited thereto.

That is, the first intermediate graphic data (intermediate graphic data #1) and the second intermediate graphic data (intermediate graphic data #2) may be stored in the shared memory lines allocated in the same index spaces, that is, the same memory line set, respectively. Otherwise, the first intermediate graphic data (intermediate graphic data #1) and the second intermediate graphic data (intermediate graphic data #2) may be stored in the shared memory lines allocated to the different memory line sets, respectively.

Similar to the first intermediate graphic data (intermediate graphic data #1), the second intermediate graphic data (intermediate graphic data #2) may not be transmitted to the external memory 200 while the value of the NRB of the second shared memory line 150b is in the first state ("1").

Next, the $N^{th}$ shader core 120_N may receive the second intermediate graphic data (intermediate graphic data #2) stored in the second shared memory line 150b. The $N^{th}$ shader core 120_N generates final resulting graphic data (output graphic data) by processing the second intermediate graphic data (intermediate graphic data #2).

The generated final resulting graphic data (output graphic data) is not stored in the shared memory line in which the communication data is storable). The final resulting graphic data (output graphic data) is stored in the cache line in which the cache data is storable, and then is transmitted to the external memory 200.

The execution of the shader program may be terminated by transmitting the final resulting graphic data (output graphic data) to the external memory 200.

In FIG. 9, the intermediate graphic data does not move between the GPU 100 and the external memory 200 while the shader program is executed. Accordingly, it is possible to decrease a bandwidth of the memory during the graphic data processing.

Referring to FIG. 4, the memory, which is allocated for the local space, is deallocated (operation S130).

For example, when it is desired to deallocate the memory of 8 Kbyte allocated as the local space, for example, "dealloc (8K, local)" may be used.

For example, the virtual address for the local space within the external memory 200 is deallocated by software (for example, DDK or kernel). Further, the physical address converted from the virtual address is also deallocated.

Referring to FIGS. 4 and 11, a value of the NRB of each of the tags having the same number of second local spaces (allocated space #2) allocated to the data storage region 134 is removed (operation S140).

That is, the value of the NRB of the shared memory line among the memory lines in the data storage region 134 is set to the second state ("0").

The values of the NRB of the memory lines included in the data storage region 134 is generally reset to the second state ("0"), so that all of the memory lines included in the data storage region 134 may be used for storing the cache data. That is, the intermediate graphic data stored in the shared memory line may also be replaced by the cache policy.

Figure 12:
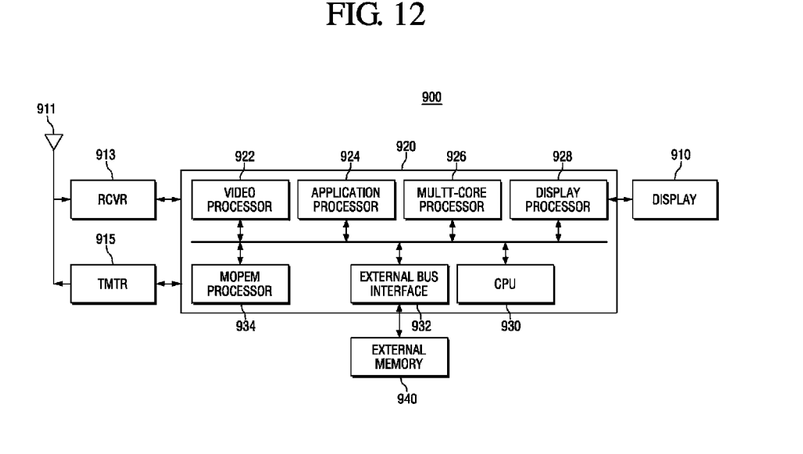
FIG. 12 is a block diagram illustrating a wireless communication device including the graphic processing unit according to an exemplary embodiment.

FIG. 12 is a block diagram illustrating a wireless communication device including the graphic processing unit according to an exemplary embodiment of the present inventive concept.

Referring to FIG. 12, a device 900 may be a cellular phone, a smart phone terminal, a handset, a personal portable information terminal (personal digital assistant (PDA)), a laptop computer, a video game unit, or other devices. The device 900 may also use code division multiple access (CDMA), time division multiple access (TDMA), such as the global system/standard for mobile communication (GSM), or other wireless communication standards.

The device 900 may provide bi-directional communication through a reception path and a transmission path. Signals transmitted by one or more base stations in the reception path may be received by an antenna 911, or provided to a receiver (RCVR) 913. The receiver 913 may condition and digitalize the received signal, and provide samples to the digital section 920 through additional processing. In the transmission path, a transmitter (TMTR) 915 may receive data transmitted from a digital section 920, process and condition the data, and generate a modulated signal, and the generated modulated signal may be transmitted to one or more base stations through the antenna 911.

The digital section 920 may be implemented by one or more digital signal processors (DSPs), micro-processors, and reduced instruction set computers (RISCs), and the like. Further, the digital section 920 may be manufactured on one or more application specific integrated circuits (ASICs) or other type integrated circuits (ICs).

The digital section 920 may include various processing and interface units, such as a modem processor 934, a video processor 922, an application processor 924, a display processor 928, a controller/multi-core processor 926, a central processing unit 930, and an external bus interface (EBI) 932.

The video processor 922 may perform processing on graphic applications, and adopt the aforementioned graphic processing units 100, 300, and 400 according to the exemplary embodiments of the present inventive concept. In general, the video processor 922 may include the predetermined number of processing units or modules for the graphic operations of a predetermined set. A specific part of the video processor 922 may be implemented by firmware and/or software. For example, the control unit may be implemented by firmware and/or software modules (for example, a procedure and a function) performing the aforementioned functions. The firmware and/or software codes may be stored in the memory 940 (for example, the external memory 200 of FIG. 1), and executed by the processor (for example, the multi-core processor 926). The memory may be implemented within or outside the processor.

The video processor 922 may implement a software interface, such as an open graphic library (OpenGL) and a Direct3D. The central processing unit 930 may perform a series of graphic processing operations together with the video processor 922. The controller/multi-core processor 926 includes two or more cores, and allocates a workload to the two cores according to a work load, which the controller/multi-core processor 926 needs to process, and simultaneously processes the corresponding workloads.

Figure 13:
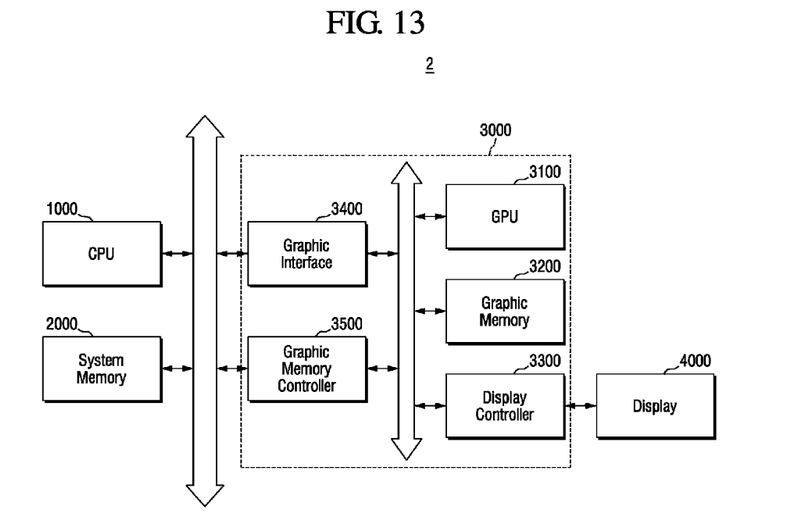
FIG. 13 is a block diagram illustrating a computing system including the graphic processing unit according to an exemplary embodiment.

FIG. 13 is a block diagram illustrating a computing system including the graphic processing unit according to an exemplary embodiment of the present inventive concept.

Referring to FIG. 13, a computing system according to the exemplary embodiment of the present inventive concept includes a central processing unit (CPU) 1000, a system memory 2000, a sub graphic system 3000, and a display device 4000.

The central processing unit 1000 is configured to generate a mesh by driving an application. The mesh may describe a surface of an object. The mesh may be configured by a plurality of primitives, and the primitive may include one or more vertexes.

The system memory 2000 is configured to store data. The system memory 2000 may store data processed by the central processing unit 1000. The system memory 2000 may serve as an operation memory of the central processing unit 1000. The system memory 2000 may include one or more volatile memory devices, such as a double data rate static random-access memory (DDR SDRAM) and a single data rate SDRAM, and/or one or more non-volatile memory devices, such as an electrical erasable programmable read-only memory (EEPROM) and a flash memory.

The graphic sub system 3000 includes a graphic processing unit (GPU) 3100, a graphic memory 3200, a display controller 3300, a graphic interface 3400, and a graphic memory controller 3500.

The graphic processing unit 3100 may be configured to be substantially the same as the aforementioned graphic processing units 100, 300, and 400 according to the exemplary embodiments of the present inventive concept. The graphic processing unit 3100 may perform tile-based rendering by using the plurality of primitives configuring the mesh. The graphic processing unit 3100 may receive data of the vertexes configuring the mesh from the central processing unit 1005. The graphic processing unit 3100 may assemble the primitives configuring one or more vertexes, and perform rendering by using the assembled primitives.

The graphic memory 3200 may store graphic data processed by the graphic processing unit 3100, or store graphic data provided to the graphic processing unit 3100. Otherwise, the graphic memory 3200 may serve as an operation memory of the graphic processing unit 3100.

The display controller 3300 controls the display device 4000 so that the rendered image frame may be displayed.

The graphic interface 3400 interfaces between the central processing unit 1000 and the graphic processing unit 3100, and the graphic memory controller 3500 provides memory access between the system memory 2000 and the graphic processing unit 3100.

Although not clearly illustrated in FIG. 13, the computing system 1000 may further include one or more input devices, such as a button, a touch screen, and a microphone, and/or one or more output devices, such as a speaker. Further, the computing system 1000 may further include an interface device for wirely or wirelessly exchanging data with an external device. The interface device may include, for example, an antenna or a wired/wireless transceiver.

According to an exemplary embodiment, the computing system 1000 may be a predetermined computing system, such as a mobile phone, a smart phone, a PDA, a desktop computer, a notebook computer, and a tablet PC.

Steps of the method or the algorithm described in relation to the exemplary embodiments of the present specification may be directly implemented by a hardware module or a software module executed by a processor, or a combination of the hardware module and the software module. The software module may reside in a RAM memory, a flash memory, a ROM memory, an EPROM memory, an EEPROM memory, a register, a hard disk, a detachable disk, a CD-ROM, or another type of random storage media well known in the art. An example of the storage medium is coupled to the processor, and the processor may read information from the storage medium and write information in the storage medium. As another method, the storage medium may be integral with the processor. The processor and the storage medium may reside within an application specific integrated circuit (ASIC). The ASIC may reside within a user terminal. As another method, the processor and the storage medium may reside within a user terminal as a separate component.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A method comprising:
   receiving a first graphic data and processing the first graphic data to generate second graphic data;
   storing the second graphic data in a first shared memory line, which is included in a first memory line set including a plurality of memory lines, and in which a state bit is set, in advance, to a first state representing that data stored in the first shared memory line is not replaceable until a final graphic data is generated, wherein at least one of the plurality of memory lines, which is different from the first shared memory line, is set, in advance, to a second state which is different from the first state and represents that the data stored in the at least one of the plurality of memory lines is replaceable;
   receiving the second graphic data stored in the first shared memory line and processing the second graphic data to generate the final graphic data;
   storing the final graphic data in the at least one of the plurality of memory lines;
   transferring the final graphic data to an external memory; and
   setting the state bit of the first shared memory line to the second state,
   wherein the first memory line set is a part of an n-way set associative cache structure and corresponds to one index space, n being a natural number equal to or greater than 2.

2. The method of claim 1, further comprising:
   setting the state bit of the first shared memory line to the first state before receiving the first graphic data.

3. The method of claim 2, wherein the setting of the state bit of the first shared memory line to the first state includes:
   allocating the external memory for a local space, and
   associating an index and a tag of the first shared memory line to one of memory addresses of the external memory.

4. The method of claim 1, further comprising:
   setting the state bit of the first shared memory line to the second state after generating the final graphic data.

5. The method of claim 4, wherein the setting of the state bit of the first shared memory line to the second state includes:
   deallocating the external memory allocated for a local space; and
   removing the first state, which is set in the state bit of the first shared memory line, after the deallocating the external memory.

6. The method of claim 4, wherein when the first shared memory line is set to the first state, the second graphic data is not transmitted to the external memory.

7. The method of claim 1, wherein the first state represents that the data stored in the first shared memory line is not replaceable by a cache policy, and
   the second state represents that the data stored in the at least one of the plurality of memory lines is replaceable by the cache policy.

8. The method of claim 1, wherein the second graphic data is not stored in a memory line, of the plurality of memory lines, which is set to the second state.

9. The method of claim 1, further comprising:
prior to the generating the final graphic data, receiving the second graphic data stored in the first shared memory line and processing the second graphic data to generate third graphic data;
storing the third graphic data to a second shared memory line, of the plurality of memory lines, in which the state bit is set to the first state; and
generating the final graphic data based on the third graphic data.

10. The method of claim 1, wherein the first memory line set further includes a second shared memory line, and the method further includes:
prior to the receiving the first graphic data, generating, by a first shader, the first graphic data and storing the first graphic data in the second shared memory line which stores the data which is not replaceable and of which the state bit is set in advance to the first state; and
receiving, by a second shader, the first graphic data retrieved from the second shared memory line.

11. A graphic processor unit, comprising:
a first shader core configured to receive input graphic data and process the input graphic data to generate first graphic data;
a second shader core configured to receive the first graphic data and process the first graphic data to generate second graphic data;
a third shader core configured to receive the second graphic data and process the second graphic data to generate final graphic data; and
a cache configured to receive the first graphic data from the first shader core, provide the first graphic data to the second shader core, receive the second graphic data from the second shader core, provide the second graphic data to the third shader core, receive the final graphic data from the third shader core, and transfer the final graphic data to an external memory,
wherein the cache comprises:
a data storage region including shared memory lines, in which the first graphic data and the second graphic data are respectively stored, and a cache line, in which a cache data including the final graphic data is stored, wherein data stored in the shared memory lines is not replaced and the data stored in the cache line is replaceable, according to a cache policy;
a communication manager configured to manage a local address of the shared memory lines, and not to manage the local address of the cache line;
a cache controller module configured to manage the local address of the cache line; and
a not replaceable bit module which makes a determination whether the data stored in the data storage region is replaceable according to the cache policy, which sets, in advance, a first state bit of the shared memory lines to a first state, sets, in advance, a second state bit of the cache line to a second state, and resets the first state bit of the shared memory lines to the second state after the final graphic data is generated,
wherein the cache has an n-way set associative cache structure, n being a natural number equal to or greater than 2,
the data storage region includes cache line sets, and
the shared memory lines and the cache line are included into at least one of the cache line sets which corresponds to one index space.

12. The graphic processor unit of claim 11, wherein the not replaceable bit module determines whether the data storage region corresponding to a virtual address of the data, which is requested by the second shader core, is one of the shared memory lines or the cache line.

13. The graphic processor unit of claim 11, wherein the cache includes a multiplexer,
when a virtual address of data is requested by the second shader core and corresponds to the local address of a shared memory line, among the shared memory lines, the multiplexer receives the local address of the shared memory line from the communication manager and provides the local address to the data storage region, and
when the virtual address of data is requested by the second shader core and corresponds to the local address of the cache line, the multiplexer receives the local address of the cache line from the cache controller module and provides the local address to the data storage region.

14. A graphic processor unit, comprising:
a first shader core configured to receive input graphic data and process the input graphic data to generate first graphic data;
a second shader core configured to receive the first graphic data and process the first graphic data to generate second graphic data;
a third shader core configured to receive the second graphic data and process the second graphic data to generate final graphic data; and
a cache configured to receive the first graphic data from the first shader core, provide the first graphic data to the second shader core, receive the second graphic data from the second shader core, provide the second graphic data to the third shader core, receive the final graphic data from the third shader core, and transfer the final graphic data to an external memory,
wherein the cache comprises:
a data storage region comprising shared memory lines which store, respectively, the first graphic data and the second graphic data which are not replaceable according to a cache policy, and a cache line configured to store a cache data, including the final graphic data, which are replaceable according to the cache policy;
a communication manager configured to manage a local address of the shared memory lines; and
a cache controller module configured to manage the local address of the cache line; and
a not replaceable bit module configured to determine whether data stored in the data storage region is replaceable according to the cache policy, to set, in advance, a first state bit of the shared memory lines to a first state, to set, in advance, a second state bit of the cache line to a second state, and to reset the first state bit of the shared memory lines to the second state after the final graphic data is generated,
wherein the cache has an n-way set associative cache structure, n being a natural number equal to or greater than 2,
the data storage region includes cache line sets, and
the shared memory lines and the cache line are included into at least one of the cache line sets which corresponds to one index space.

15. The graphic processor unit of claim 14, wherein the not replaceable bit module is configured to determine whether the data storage region corresponding to a virtual address of the data, which is requested by the second shader core, is one of the shared memory lines or the cache line.

* * * * *